No. 652,030. Patented June 19, 1900.
H. LENTZ.
METHOD OF MAKING DOUBLE BEAT VALVES.
(Application filed Nov. 20, 1899.)
(No Model.)
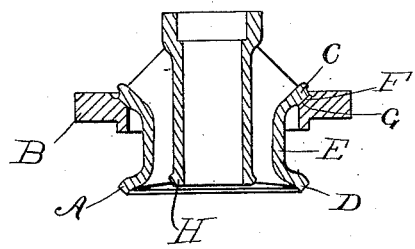
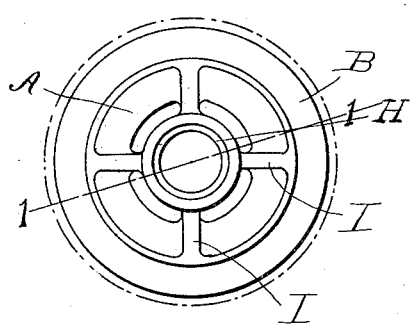
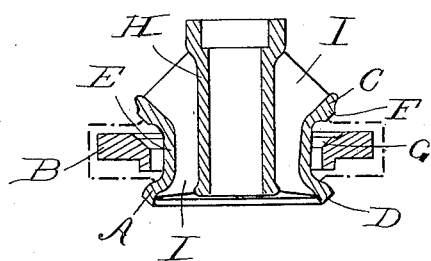

UNITED STATES PATENT OFFICE.

HUGO LENTZ, OF BRÜNN, AUSTRIA-HUNGARY.

METHOD OF MAKING DOUBLE-BEAT VALVES.

SPECIFICATION forming part of Letters Patent No. 652,030, dated June 19, 1900.

Application filed November 20, 1899. Serial No. 737,612. (No model.)

*To all whom it may concern:*

Be it known that I, HUGO LENTZ, a citizen of Austria, residing at Brünn, Austria-Hungary, have invented certain new and useful Improvements in Methods of Making Balanced Double-Beat Valves; and I do hereby declare the following to be a full, clear, and exact description of the invention, such as will enable others skilled in the art to which it appertains to make and use the same.

My invention relates to a novel method of making balanced double-beat valves, the object being to provide a method whereby the two seats of said valve may be relatively proportioned in any desired manner; and it consists in the novel steps hereinafter fully described and claimed.

In the accompanying drawings, illustrating my invention, Figure 1 is a sectional view of a valve and one of its seats made by my method and taken on the line 1 1 of Fig. 2. Fig. 2 is a top plan view of same. Fig. 3 is a section similar to Fig. 1, showing the valve and seat in closed contact.

Double-beat valves, so far as I am informed, have heretofore been made with seats of necessarily-different diameters, owing to the fact that the lower end of the valve must pass through the upper seat, or vice versa, and consequently a perfectly-balanced valve could not be produced. To overcome this difficulty, I have invented a method of making the valve and one of its seats in one piece and subsequently separating same, so that they are relatively movable, but not separable. To this end the valve A and its seat B are cast, forged, or otherwise formed in one piece, the seat forming a heavy circumferential flange on the valve, as indicated by dot-and-dash lines in Figs. 1 and 2, said valve A having flaring ends C and D and a reduced middle portion E, carrying said seat B. Said valve A and seat B are then placed in a lathe and turned off, the flange being first turned to the desired form of seat and then separated from said valve A, the opening in the middle of said seat B being of less diameter than said flaring ends C and D of said valve. Said valve is also turned off to its desired form before said seat is separated therefrom, the flaring end C being turned off circumferentially to form an annular shoulder or seat F to fit a similar shoulder or seat G on said seat B. The edge of the flaring end D is also turned to form a seat to coact with the other seat (not shown) for said valve. Said valve A is hollow and is provided with a central sleeve H to receive a stem, said central sleeve being supported by radial spokes I. By means of my method the seats or contact-surfaces formed on said flaring ends C and D may be made of equal or very slightly-different diameters, as desired, so as to produce a perfectly-balanced valve.

I claim as my invention—

The method of making balanced double-beat valves, which consists in casting or otherwise forming a valve provided with flaring ends, and a circumferential flange between said ends, and subsequently turning off said flange to form a seat for one of said flaring ends and then separating said flange from said valve to permit relative movement.

In testimony whereof I affix my signature in presence of two witnesses.

HUGO LENTZ.

Witnesses:
 MARIO VENNATE,
 W. DRAHOKOSIPIL.